United States Patent
Armbruster et al.

(10) Patent No.: US 10,103,933 B2
(45) Date of Patent: Oct. 16, 2018

(54) DETECTION OF A FAULTY NODE IN A NETWORK

(71) Applicant: Siemens Aktiengesellschaft, München (DE)

(72) Inventors: Michael Armbruster, München (DE); Ludger Fiege, Grafing (DE); Johannes Riedl, Ergolding (DE); Thomas Schmid, Leinfelden-Echterdingen (DE); Andreas Zirkler, München (DE)

(73) Assignee: SIEMENS AKTIENGESELLSCHAFT (DE)

( * ) Notice: Subject to any disclaimer, the term of this patent is extended or adjusted under 35 U.S.C. 154(b) by 3 days.

(21) Appl. No.: 15/119,351

(22) PCT Filed: Mar. 19, 2015

(86) PCT No.: PCT/EP2015/055755
§ 371 (c)(1),
(2) Date: Aug. 16, 2016

(87) PCT Pub. No.: WO2015/150085
PCT Pub. Date: Oct. 8, 2015

(65) Prior Publication Data
US 2017/0019290 A1    Jan. 19, 2017

(30) Foreign Application Priority Data

Mar. 31, 2014   (DE) .................. 10 2014 206 053

(51) Int. Cl.
*H04L 12/24*   (2006.01)
*H04L 12/26*   (2006.01)

(52) U.S. Cl.
CPC ...... *H04L 41/0631* (2013.01); *H04L 41/0645* (2013.01); *H04L 41/0677* (2013.01);
(Continued)

(58) Field of Classification Search
None
See application file for complete search history.

(56) References Cited

U.S. PATENT DOCUMENTS 6,587,432 B1 *  7/2003  Putzolu ............... H04Q 3/0087
                                                        370/229
6,658,586 B1 * 12/2003  Levi ....................... B60R 25/04
                                                        714/4.3
(Continued)

FOREIGN PATENT DOCUMENTS

EP       1861939 B1    11/2013
JP    2000341272 A     12/2000
(Continued)

OTHER PUBLICATIONS

Zhou R. et al: "On design and formal verification of SNSP: a novel real-time communication protocol for safety-critical applications"; Journal of Supercomputing; Kluwer academic Publishers, Dordrecht; NL; Bd. 69; Nr. 3; pp. 1254-1283; XP035393948; ISSN: 0920-8542, DOI:10.1007/S11227-014-1157-2; 2014.
(Continued)

*Primary Examiner* — Bunjob Jaroenchonwanit
(74) *Attorney, Agent, or Firm* — Schmeiser Olsen & Watts LLP

(57) ABSTRACT

Methods and apparatuses for increasing quality of service in a network having nodes if there is a faulty node which can result in data traffic being overloaded in at least one part of the network are provided. The disclosed embodiments of the invention can be used in the field of safety-critical applications, such as medial applications, monitoring devices, and in-vehicle communication systems.

10 Claims, 3 Drawing Sheets

Figure 1:
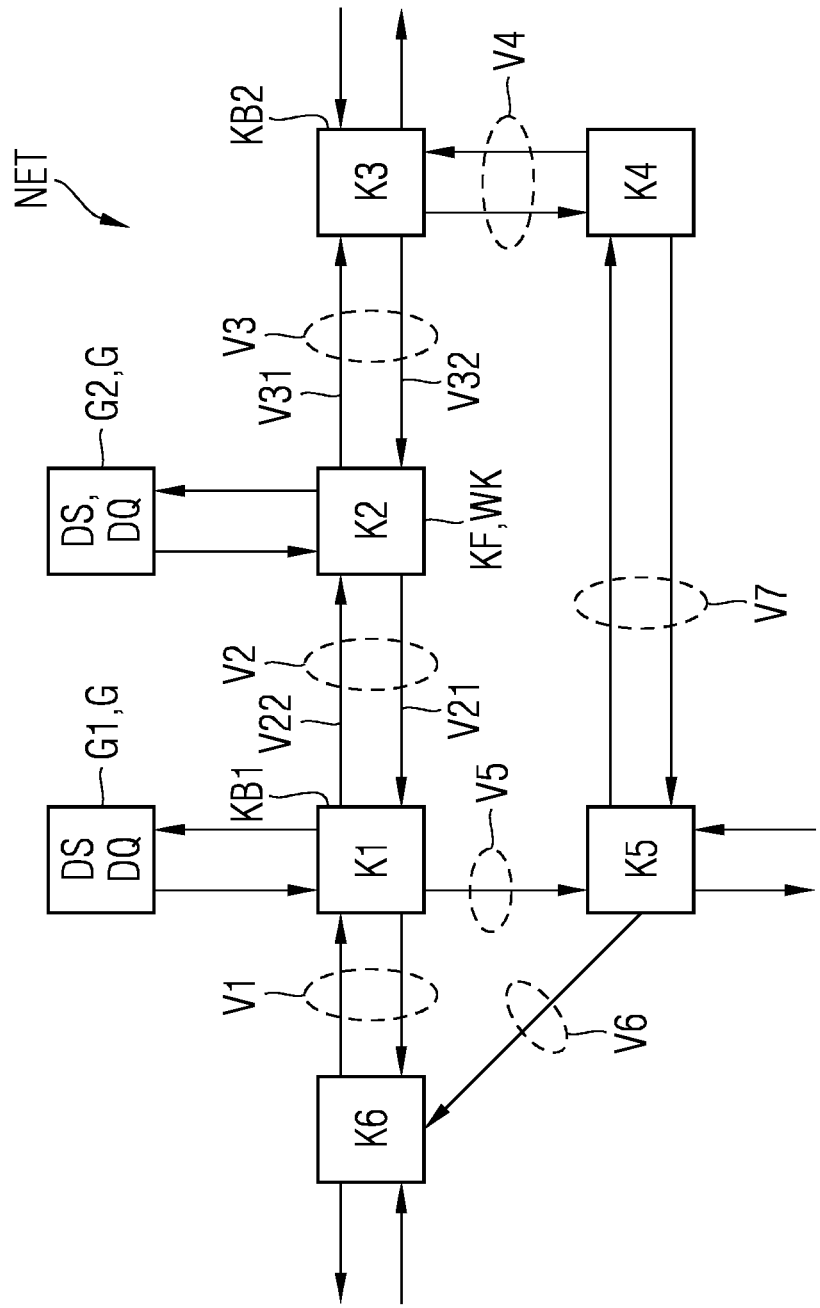

(52) U.S. Cl.
 CPC ...... *H04L 41/5035* (2013.01); *H04L 43/0888* (2013.01); *H04L 43/16* (2013.01); *H04L 41/147* (2013.01)

(56) References Cited

U.S. PATENT DOCUMENTS

| | | | |
|---|---|---|---|
| 6,813,245 B1 | 11/2004 | Furuno | |
| 8,811,150 B2 * | 8/2014 | Bauchot | H04L 41/0627 370/216 |
| 8,885,488 B2 * | 11/2014 | Vobbilisetty | H04L 43/0811 370/241.1 |
| 9,270,792 B2 * | 2/2016 | Dayanandan | H04L 69/324 |
| 2003/0158623 A1 * | 8/2003 | Kumano | H04L 43/00 700/213 |
| 2004/0085899 A1 | 5/2004 | Magill et al. | |
| 2005/0041593 A1 | 2/2005 | Kikuchi et al. | |
| 2006/0187817 A1 | 8/2006 | Charzinski et al. | |
| 2007/0094491 A1 * | 4/2007 | Teo | H04L 63/1408 713/153 |
| 2008/0297342 A1 * | 12/2008 | Wu | G06Q 10/06 340/539.13 |
| 2010/0080141 A1 * | 4/2010 | Nakamura | H04L 43/0817 370/252 |
| 2010/0082809 A1 * | 4/2010 | Nakamura | H04L 43/0817 709/224 |
| 2010/0303089 A1 * | 12/2010 | Gerdes | H04L 29/12113 370/401 |
| 2012/0008493 A1 | 1/2012 | Magill | |
| 2012/0079101 A1 * | 3/2012 | Muppala | H04L 43/18 709/224 |
| 2014/0047282 A1 | 2/2014 | Deb et al. | |
| 2014/0092753 A1 | 4/2014 | Vasseur et al. | |
| 2014/0328171 A1 | 11/2014 | Armbruster et al. | |
| 2015/0220417 A1 * | 8/2015 | Diment | G06F 11/3438 709/224 |
| 2016/0212099 A1 * | 7/2016 | Zou | H04L 63/0263 |
| 2016/0366041 A1 * | 12/2016 | Seenappa | H04L 43/12 |
| 2017/0093910 A1 * | 3/2017 | Gukal | H04L 63/1416 |
| 2017/0140163 A1 * | 5/2017 | Hanner, Sr. | G06F 21/6209 |
| 2017/0266560 A1 * | 9/2017 | Harris | A63F 13/45 |

FOREIGN PATENT DOCUMENTS

| | | |
|---|---|---|
| JP | 2005072723 A | 3/2005 |
| JP | 2011160374 A | 8/2011 |
| JP | 2013175837 A | 9/2013 |
| JP | 2013255196 A | 12/2013 |
| WO | 200800157 A1 | 1/2008 |

OTHER PUBLICATIONS

International Search Report for PCT Application No. PCT/EP2015/055755, dated May 21, 2015.
German Office Action for German Application No. 2016-560490, dated Jan. 9, 2018.

\* cited by examiner

DETECTION OF A FAULTY NODE IN A NETWORK

CROSS-REFERENCE TO RELATED APPLICATIONS

This application claims priority to PCT Application No. PCT/EP2015/055755, having a filing date of Mar. 19, 2015, based off of German application No. DE 102014206053.2 having a filing date of Mar. 31, 2014, the entire contents of which are hereby incorporated by reference.

FIELD OF TECHNOLOGY

The following relates to methods and apparatuses for increasing quality of service in a network.

BACKGROUND

In addition to transmitting voice and image data, networks are nowadays often used for safety-critical applications. For example, an automation system consists of a plurality of control computers, sensors and actuators which constitute nodes in a network. In this case, data communication between the nodes must not be disrupted by a malfunction of an individual node in such a manner that the functional safety of the entire automation system is jeopardized. Such a fault is known under the name "babbling idiot", for example. This can be understood as meaning a node which, contrary to planned resource agreements and possibly even contrary to a data communication specification, transmits a large quantity of data and therefore occupies the network and hinders or even corrupts communication between other nodes.

A German patent application DE 10 2012 000 185 proposes ensuring improved failure safety and fault analysis in a network in the event of transmission and hardware faults, in particular in the event of "babbling idiot" faults, by assigning fuse devices at receiving ports of switch devices for the purpose of monitoring a respective data transmission rate. The fuse devices block reception of data at the respective receiving port if a previously predefined maximum data transmission rate is exceeded. This procedure is advantageous since it can be easily implemented and achieved. However, the disadvantage is that, in the event of severe fluctuations in the data transmission rate, a false alarm could be triggered on the basis of the predefined maximum data transmission rate, which false alarm incorrectly blocks the reception of data. This results in undesired loss of data, as a result of which quality of service of the network falls. In addition, it is necessary to know and set an expected data rate in advance.

SUMMARY

An aspect relates to specifying methods and apparatuses which are used to increase quality of service in a network if there is a faulty node which can result in data traffic being overloaded in at least one part of the network.

Embodiments of the invention relate to a method for increasing quality of service in a network having a plurality of nodes if there is a faulty node, in which the nodes are connected to one another via respective connections for the purpose of interchanging data packets, the faulty node is coupled to at least one device, and the at least one device operates as a data sink and/or a data source, having the following steps of:

a) selecting at least one of the nodes as a monitored node;
b) producing at least two observer nodes by selecting from the plurality of nodes, the monitored node being excluded from the selection, in such a manner that
  both incoming data traffic of a respective data packet class to the monitored node from at least one of the at least two observer nodes
  and outgoing data traffic of the respective data packet class from the monitored node to at least one of the at least two observer nodes are completely determined;
c) recording the incoming data traffic and the outgoing data traffic of the respective observer nodes;
d) generating expected total outgoing data traffic of the monitored node on the basis of (i) the outgoing data traffic produced by the respective incoming data traffic of the respective data packet class and (ii) expected data traffic of the data source of the at least one device;
e) generating a difference value from a difference between the outgoing data traffic and the expected total outgoing data traffic;
f) detecting the monitored node as a faulty node if the difference value exceeds a predefinable threshold value.

The method exhibits the advantage that the monitored node can be identified as a faulty node on the basis of the incoming data traffic. In other words, the threshold at which the monitored node is identified as a faulty node is dynamically adapted to the incoming data traffic. This makes it possible to use embodiments of the invention in a singular Ethernet ring structure, in which the necessary redundancy is achieved by using both directions in the ring, for fail-operational communication.

Completely means that the entire data traffic from one node to the monitored node and from the monitored node to one of the nodes in the network is analyzed by the observer nodes. The nodes K1 and K3 are selected as observer nodes KB1, KB2 since they can completely record the entire incoming data traffic and the entire outgoing data traffic of the node K2. In particular, the incoming and outgoing data traffic runs completely via these observer nodes. Completely does not mean that all data packet classes have to be included in the monitoring. In particular, it may be advantageous to monitor only safety-critical or high-priority data packet classes.

In an extension of embodiments of the invention, the expected total outgoing data traffic of the monitored node is formed by summing
(i) one or more expected outgoing data traffic items and
(ii) the expected data traffic of the data source of the at least one device, a respective expected outgoing data traffic item being formed by multiplying
(a) a number of outgoing data packets for each incoming data packet of the respective data packet class and
(b) the respectively associated incoming data traffic.

This specifies a calculation rule for determining the expected total outgoing data traffic, which rule can be implemented and carried out in a simple and therefore cost-effective manner.

The data packet class is advantageously determined by at least one of the following properties of the respective data packet of the incoming data traffic and of the outgoing data traffic:
  a) "unicast" forwarding type
  b) "multicast" forwarding type
  c) "broadcast" forwarding type
  d) priority class.

As a result, the expected total outgoing data traffic can be determined in a very accurate manner since the determination takes into account the specific characteristics of different data packet classes. The accurate determination makes it possible to improve incorrect identification of the monitored node as a faulty node or as a node which is not faulty, thus further increasing the quality of service in the network.

The expected outgoing data traffic is thus set to be equal to the incoming data traffic for the data packet class of the "unicast" forwarding type. The expected outgoing data traffic for the data packet class of the "multicast" forwarding type is thus determined by a result of multiplying an available number of connection outputs of the monitored node to directly adjacent nodes of the monitored node by the incoming data traffic, the available number being determined between zero and a number of connection outputs to directly adjacent nodes of the monitored node which has been reduced by one. The expected outgoing data traffic for the data packet class of the "broadcast" forwarding type can thus be determined by a result of multiplying a number of connection outputs to directly adjacent nodes of the monitored node which has been reduced by one by the incoming data traffic. Using these specific calculation rules advantageously makes it possible to ensure that different implementations of embodiments of the invention identify the monitored node as a faulty node in the same manner. This further increases the reliability of the network.

The steps of the method are advantageously carried out only if the outgoing data traffic exceeds a predefinable volume of data per unit of time. This ensures that the method loads system resources of a network only if critical volumes of data are received.

In one advantageous development of embodiments of the invention, at least one of the connections of the monitored node, in particular at least one of the connections going out from the monitored node, is interrupted if the monitored node is detected as a faulty node. This avoids a malfunction of the network since the network is not flooded with a large volume of data. This increases the quality of service of the network if the faulty node is present.

Embodiments of the invention also relates to an apparatus for increasing quality of service in a network having a plurality of nodes if there is a faulty node, in which the nodes are connected to one another via respective connections for the purpose of interchanging data packets, the faulty node is coupled to at least one device and the at least one device operates as a data sink and/or a data source, having the following units:
a) a first unit for selecting at least one of the nodes as a monitored node;
b) a second unit for producing at least two observer nodes by selecting from the plurality of nodes, the monitored node being excluded from the selection, in such a manner that both incoming data traffic of a respective data packet class to the monitored node from at least one of the at least two observer nodes
   and outgoing data traffic of the respective data packet class from the monitored node to at least one of the at least two observer nodes are completely determined,
c) a third unit for recording the incoming data traffic and the outgoing data traffic of the respective observer nodes;
d) a fourth unit for generating expected total outgoing data traffic of the monitored node on the basis of (i) the outgoing data traffic produced by the respective incoming data traffic of the respective data packet class and (ii) expected data traffic of the data source of the at least one device;
e) a fifth unit for generating a difference value from a difference between the outgoing data traffic and the expected total outgoing data traffic;
f) a sixth unit for detecting the monitored node as a faulty node if the difference value exceeds a predefinable threshold value.

This makes it possible to advantageously implement and carry out embodiments of the invention. Advantages of the apparatus are similar to those of the corresponding method steps.

In one advantageous development of the apparatus, the apparatus has a seventh unit which is configured in such a manner that one or more of the method steps described above can be implemented and carried out using the seventh unit. Advantages of the apparatus are similar to those of the corresponding method steps.

BRIEF DESCRIPTION

Figure 2:
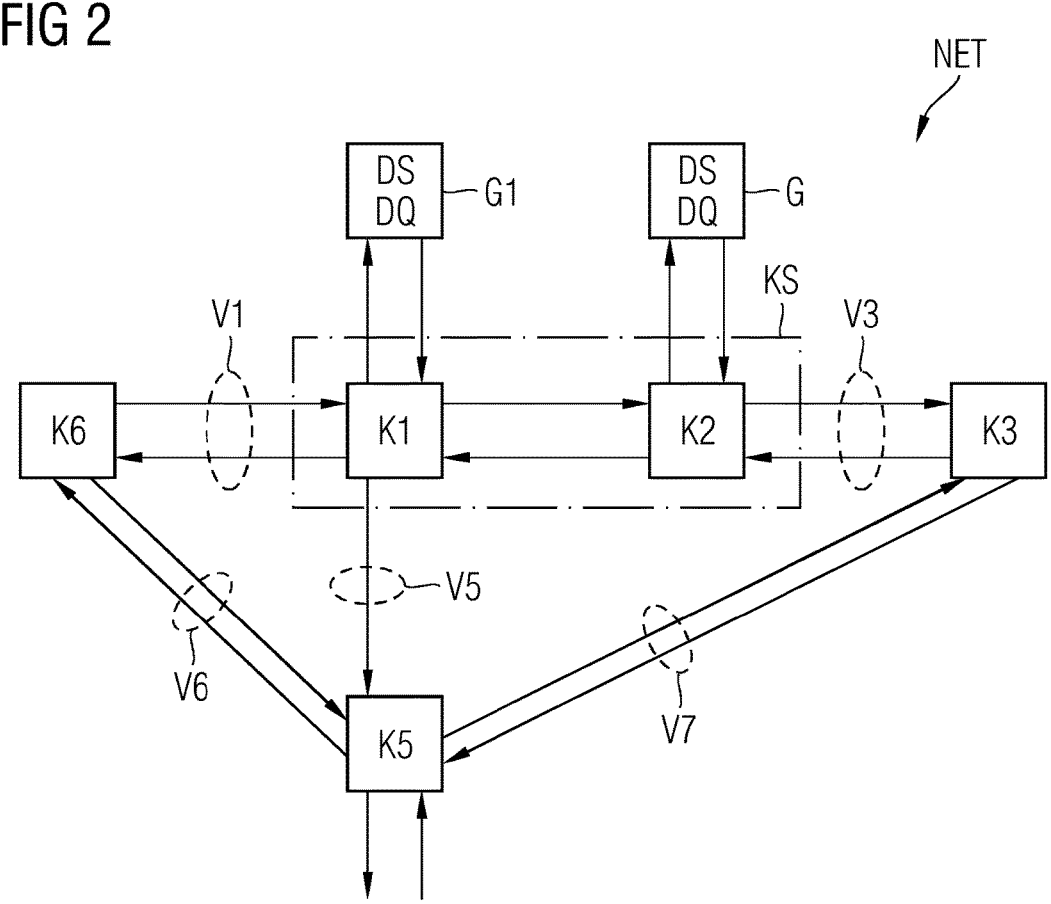
Figure 3:
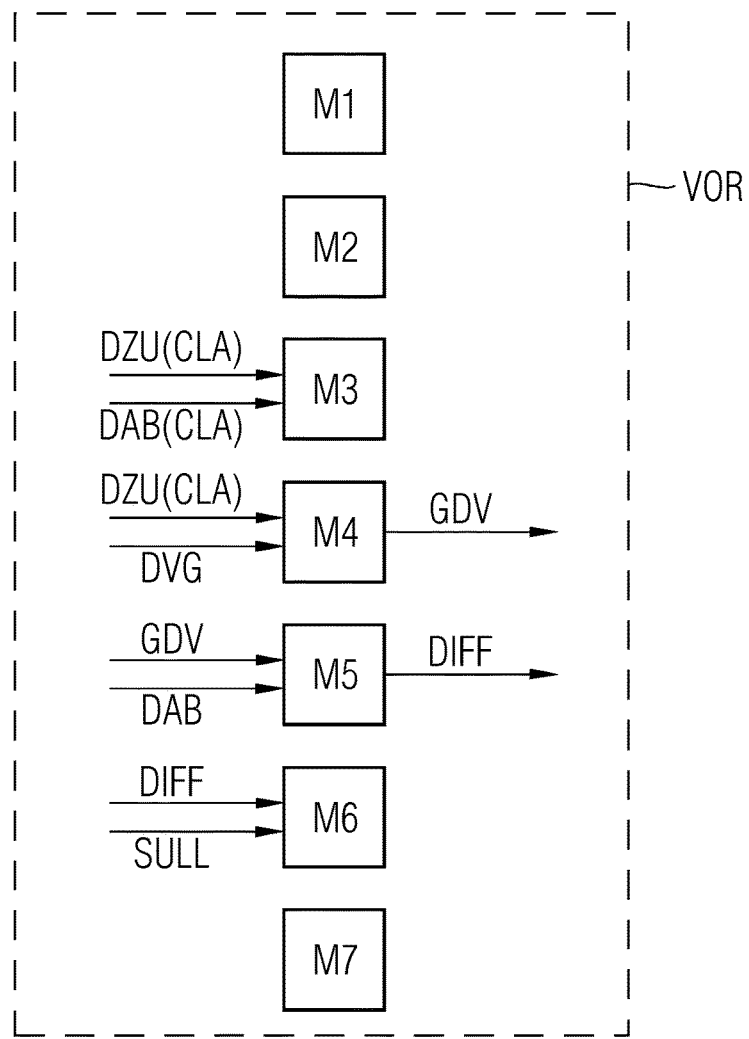

Some of the embodiments will be described in detail, with reference to the following figures, wherein like designations denote like members wherein:

FIG. 1 a network having a faulty node according to a first exemplary embodiment;

FIG. 2 a network according to a second exemplary embodiment in which a plurality of possibly faulty nodes are monitored together;

FIG. 3 an apparatus for carrying out the invention; and

Figure 4:
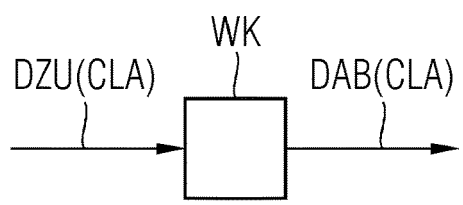

FIG. 4 a monitored node having incoming data traffic and outgoing data traffic.

Elements having the same function and method of operation are provided with the same reference symbols in the Figures.

DETAILED DESCRIPTION

A first exemplary embodiment according to FIG. 1 shows six nodes K1, . . . , K6 which are connected to one another via connections V1, . . . , V7. A respective arrow indicates a transmission direction for each connection. A unidirectional transmission direction therefore exists from the node K2 to the node K1 via a partial connection V21 and a further unidirectional partial connection V22 exists from node K1 to node K2. An arrow direction therefore indicates a unidirectional transmission direction.

Some of the nodes have coupled devices G, G1, G2, these devices, in contrast to the nodes, not forwarding data packets to further nodes, but rather themselves being in the form of a data sink, that is to say a receiver of data packets, and/or a data source, that is to say a producer of data packets.

In the present example, the network NET is part of an automation network in a production plant, the devices G1, G2 each being position sensors which provide the respectively coupled nodes with measured values for a geographical position of components on a conveyor belt in the form of a respective data packet at regular intervals for forwarding. In addition, these devices can be parameterized with parameters received by the devices by means of data packets, for example in terms of the times at which measured values are intended to be recorded.

The intention is then to check whether the node K2 is a faulty node KF which, like a "babbling idiot", hinders data communication from the node K3 to the node K1 on account of excessive packet generation. The node K2 is therefore a monitored node (WK).

For this purpose, two observer nodes KB1, KB2 are first of all selected in the network, which observer nodes completely record both incoming data traffic DZU of a respective data packet class CLA to the monitored node and outgoing data traffic DAB of the respective data packet class CLA from the monitored node to the nodes. Completely means that the entire data traffic from one node to the monitored node and from the monitored node to one of the nodes in the network is analyzed by the observer nodes. The nodes K1 and K3 are selected as observer nodes KB1, KB2 since they can completely record the entire incoming data traffic and the entire outgoing data traffic of the node K2. In particular, the incoming and outgoing data traffic runs completely via these observer nodes.

According to FIG. 1, the incoming data traffic DZU is obtained by the partial connections V22 and V32. For this purpose, the observer nodes observe their respective outputs which belong to the partial connections V22 and V32, that is to say the associated ports, and determine the volumes of data occurring there for each data packet class over a predefinable period of 100 ms (ms—milliseconds), for example. In the example, it is assumed that there is only a single data packet class. In the present example, the incoming data traffic DZU is 20 kB. In a similar manner, the observer nodes observe the partial connections V21 and V31 at their respective inputs, that is to say ports, which partial connections correspond in total to the outgoing data traffic DAB. In the present example, DAB=30,000 bytes.

It is also known that the device G1 can produce expected data traffic DVG of 200 bytes in the period of 100 ms.

In an intermediate step, expected outgoing data traffic DVW1 is calculated by

DVW1=A(CLA)×DZU.

In this case, a number A determines how many outgoing data packets are produced for each incoming data packet for a predefinable data packet class. In the current example, a length of an incoming data packet is assumed to be identical to the corresponding outgoing data packet.

In the present example, it is assumed that the data packets of the respective data traffic are exclusively of a data packet class of a unicast forwarding type. The forwarding type is predefined, for example, by a special mark in the data packet or by the configuration of the network. In this context, unicast means that a data packet which is received by a node is forwarded only to one of the adjacent nodes or to the device. Therefore, A(CLA)=1. In the present example, the first expected outgoing data traffic DVW1 is determined as DVW1=1×20 kB=20,000 bytes.

Since only data packets in the data packet class of the unicast forwarding type are sent, the expected total outgoing data traffic GDV resulting from the expected outgoing data traffic and the expected data traffic of the data source of the device G2 is determined as:

GDV=DVW1+DVG=20 kB+200 bytes=20,200 bytes.

This means that the node K2 should produce total outgoing data traffic of 20.2 kB.

It is then checked whether the monitored node WK is a faulty node KF. For this purpose, a difference value is formed from the difference between the outgoing data traffic DAB and the expected total outgoing data traffic GDV as DIFF=DAB−GDV=30,000 bytes−20,200 bytes=9800 bytes.

This difference value is then compared with a predefinable threshold value SWLL. If the difference value exceeds the predefinable threshold value, that is to say DIFF>SWLL, the monitored node WK is detected as a faulty node KF. In the present case, the threshold value is set to 1500 bytes in order to be able to take into account delays when processing data packets received at the monitored node WK and data packets sent at the monitored node WK. Since (DIFF=9800 bytes)>(SWLL=1500 bytes), the node K2 is identified as a node operating in a faulty manner.

In an alternative embodiment, the threshold SWLL is set to a predefinable percentage of the incoming data traffic DZU, for example SWLL=10%×DZU, in order to be able to adapt the threshold to different volumes of data of the incoming data traffic.

Since the node K2 is identified as a faulty node KF, it is removed from the network, with the result that it can then no longer disrupt the entire network. For this purpose, the nodes K1 and K3 can interrupt their connections V2, V3, for example by neither transmitting data to the faulty node nor accepting data from the faulty node. This prevents the faulty node KF, which acts as a "babbling idiot", from disrupting the entire network or data communication in the network coming to a standstill on account of the multiplicity of data packets.

In the preceding exemplary embodiment, the forwarding type of the data packets was selected as "unicast". In addition, yet further forwarding types such as "broadcast" and "multicast" are common. The broadcast forwarding type means that a plurality of data packets are produced for each data packet arriving at one of the nodes and are output at the respective outputs of the node. Second expected outgoing data traffic DVW2 is therefore determined by multiplying a number of connection outputs to directly adjacent nodes of the monitored node which has been reduced by one by the incoming data traffic. Specifically, FIG. 1 shows that the monitored node has two outputs which are connected to directly adjacent nodes K1 and K3. The second expected outgoing data traffic is therefore determined as DVW2=(2−1)×DZU. A data packet is therefore forwarded in the case of the "broadcast" forwarding type. In another scenario, a node has five outputs to directly adjacent nodes. In this case, the second expected outgoing data traffic DVW2 is determined as DVW2=(5−1)×DZU. In this case, four data packets are produced by said node for an incoming data packet.

In one development or alternative embodiment of the invention, "multicast" is selected as the forwarding type. This forwarding type is distinguished by the fact that a data packet is transmitted to 0, 1 to n outputs which lead directly from the node to adjacent nodes. The specific number of data packets to be transmitted for each incoming data packet depends on the specific parameterization of the node; for example, three of five outputs of the node are parameterized in such a manner that a "multicast" data packet is forwarded only to the three of the five outputs.

Instead of or in addition to the forwarding types as data packet classes, such as "unicast" or "multicast", embodiments of the invention can distinguish priority classes. For example, there are three priority classes: basic, extension 1 and extension 2. In this case, the faulty node can be located specifically for one of the three priority classes. Alternatively, however, it is also possible to consider two or more classes together in order to determine the expected total outgoing data traffic GDV therefrom. For example, the observer nodes consider the data packets which correspond to the basic priority class and, at the same time, correspond to unicast or broadcast as forwarding types. According to this specification, the observer nodes determine the incoming data traffic and outgoing data traffic matching this specification for each data packet class.

In the subsequent determination of the expected total outgoing data traffic, the respective expected outgoing data traffic is determined separately for each data packet class.

The following table shows an overview of the respective incoming data traffic, the respective outgoing data traffic and the respective expected outgoing data traffic for each data packet class for an observation period of 2 s, the respective traffic values resulting from a sum of the respective values determined at the respective observer nodes:

| Data packet class | Incoming data traffic DZU of the respective data packet class | Outgoing data traffic DAB of the respective data packet class | Expected outgoing data traffic |
|---|---|---|---|
| 1. unicast | 5000 bytes | 4500 bytes | DVW1 = 5000 bytes |
| 2. broadcast | 7500 bytes | 20,000 bytes | DVW2 = 2 × 7500 bytes = 15,000 bytes |

In the present exemplary embodiment, the expected total outgoing data traffic can be determined by summing the respective expected outgoing data traffic values of the respective data packet class and the expected data traffic of the data source of the at least one device. This results in:

GDV=DVW1+DVW2+DVG=5000 bytes+15,000 bytes+250 bytes

GDV=20,250 bytes

On account of the time delays between receiving and transmitting data packets, the threshold value SWLL=1000 bytes is selected. The difference value DIFF=(4500 bytes+20,000 bytes)−20,250 bytes=4250 bytes Since SWLL>DIFF, the monitored node is a faulty node KF.

In one alternative of the method, not only is a single node having a device monitored, but rather two or more nodes, which are each at least coupled to a device, can also be monitored.

In FIG. 2, the nodes K1 and K2 having the devices G1, G2 are intended to be monitored. For this purpose, a collective node KS is first of all formed from the nodes G1, G2, which collective node has all connections which leave from K1 and K2 but not the connections to the respective devices and not to K1 and K2 themselves. The collective node comprises the connections V1, V5 and V3. The observer nodes are then selected as K6, K5 and K3 which can determine the entire incoming data traffic to the collective node and the entire outgoing data traffic from the collective node. The collective node is the monitored node WK.

A procedure for determining the expected total outgoing data traffic, the difference value and the statement regarding whether or not the monitored node is a faulty node is similar to that in the preceding examples. The evaluation in order to determine whether the monitored node is a faulty node then indicates, however, that at least one of the two nodes K1, K2 is a faulty node. If the monitored node is identified as a faulty node, both nodes K1, K2 can be removed, that is to say isolated, from the network, with the result that no data packets are sent to them or accepted from them.

In order to locate which of the two nodes K1, K2 contained in the collective node is a faulty node, it is then possible to proceed in such a manner that the node K1 and the node K2 are checked separately in order to determine whether the respective node is a faulty node. In the present example according to FIG. 2, only the node K2 is then examined for faulty behavior. If it emerges that node K2 is faulty, it can be blocked. If it emerges that node K2 is operating in a fault-free manner, the faulty node must be K1. In this case, node K1 can be blocked in such a manner that it cannot send any data into the network.

In order to avoid excessive loading of the respective nodes by using the individual steps of embodiments of the invention, the method can be used to increase the quality of service only when a connection or the outgoing data traffic of a specific node exceeds an adjustable volume of data per unit of time. For example, the network allows a bandwidth of 100 Mbit/s on the respective connections. The data threshold is thus set to 70%×100 Mbit/s=70 Mbit/s, for example. This means that, if a connection and/or outgoing data traffic of a specific node exceed(s) this predefinable volume of data DS per time, the method is started and a check is carried out in order to determine whether or not the considered node is a faulty node.

Embodiments of the invention can be implemented and carried out by means of an apparatus VOR having a plurality of units. FIG. 3 shows an exemplary apparatus having the following units:

a) a first unit M1 for selecting at least one of the nodes K1, . . . , K6 as a monitored node WK;

b) a second unit M2 for producing at least two observer nodes KB1, KB2 by selecting from the plurality of nodes K1, K3, the monitored node WK being excluded from the selection, in such a manner that
   both incoming data traffic DZU, DZU1 of a respective data packet class CLA to the monitored node WK from at least one of the at least two observer nodes KB1, KB2
   and outgoing data traffic DAB of the respective data packet class CLA from the monitored node WK to at least one of the at least two observer nodes K1, K3 are completely determined, c) a third unit M3 for recording the incoming data traffic DZU and the outgoing data traffic DAB of the respective observer nodes KB1, KB2;

d) a fourth unit M4 for generating expected total outgoing data traffic GDV of the monitored node WK on the basis of (i) the outgoing data traffic produced by the respective incoming data traffic DZU of the respective data packet class CLA and (ii) expected data traffic DVG of the data source DQ of the at least one device G;

e) a fifth unit M5 for generating a difference value DIFF from a difference between the outgoing data traffic DAB and the expected total outgoing data traffic GDV; f) a sixth unit M6 for detecting the monitored node WK as a faulty node KF if the difference value DIFF exceeds a predefinable threshold value SWLL.

The apparatus VOR may also have a seventh unit M7 which can be used to implement and carry out extensions and/or alternatives of embodiments of the invention.

The units M1, . . . , M7 can be implemented in one or more of the nodes in the network, for example in the observer nodes KB1, KB2, the nodes communicating with one another via the network in order to communicate and also interchange values such as the incoming data traffic. In order to ensure secure communication between said nodes, the latter may possibly communicate via connections, these connections not leading via the monitored node. Therefore, some of the units may be implemented and realized on a plurality of nodes and some other units may be implemented and realized only on one of the nodes. The units and their functions can be distributed among the observer nodes as follows:

Observer node KB1:
  First unit M1
  Second unit M2
  Third unit M3
  Fourth unit M4
  Fifth unit M5
  Sixth unit M6
  Seventh unit M7
Observer node KB2:
  Third unit M3

It is noted that not all units or method steps need to be distributed among the observer nodes. Rather, the units or method steps can be implemented and realized in a manner distributed among a plurality of nodes in the network, the monitored node itself not realizing any of the units or method steps.

The units M1, . . . , M7 may be in software, hardware or in a combination of software and hardware. In this case, individual method steps may be stored in a machine-readable code in a memory. The memory can be connected to a processor in such a manner that this processor can read the machine-readable code from the memory and can execute the respective coded instructions of the machine-readable code. The processor can also be connected to an input and/or output unit which can be used to interchange information with other units and nodes.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for increasing quality of service in a network having a plurality of nodes if there is a faulty node, in which the nodes are connected to one another via respective connections for the purpose of interchanging data packets, the faulty node is coupled to at least one device, and the at least one device operates as a data sink and/or a data source, having the following steps of:
  a) selecting at least one of the nodes as a monitored node;
  b) producing at least two observer nodes (KB1, KB2) by selecting from the plurality of nodes, the monitored node being excluded from the selection, in such a manner that both incoming data traffic of a respective data packet class to the monitored node from at least one of the at least two observer nodes and outgoing data traffic of the respective data packet class from the monitored node to at least one of the at least two observer nodes are completely determined;
  c) recording the incoming data traffic and the outgoing data traffic of the respective observer nodes;
  d) generating expected total outgoing data traffic of the monitored node on the basis of (i) the outgoing data traffic produced by the respective incoming data traffic of the respective data packet class and (ii) expected data traffic of the data source of the at least one device;
  e) generating a difference value from a difference between the outgoing data traffic and the expected total outgoing data traffic; and
  f) detecting the monitored node as a faulty node if the difference value exceeds a predefinable threshold value.

2. The method as claimed in claim 1, wherein the expected total outgoing data traffic of the monitored node is formed by summing
  (i) one or more expected outgoing data traffic items and
  (ii) the expected data traffic of the data source of the at least one device, a respective expected outgoing data traffic item being formed by multiplying (a) a number of outgoing data packets for each incoming data packet of the respective data packet class (and (b) the respectively associated incoming data traffic.

3. The method as claimed in claim 1, wherein the data packet class is determined by at least one of the following properties of the respective data packet of the incoming data traffic and of the outgoing data traffic: e) "unicast" forwarding type f) "multicast" forwarding type g) "broadcast" forwarding type; and h) priority class.

4. The method as claimed in claim 3, wherein the expected outgoing data traffic is set to be equal to the incoming data traffic for the data packet class of the "unicast" forwarding type.

5. The method as claimed in claim 3, wherein the expected outgoing data traffic for the data packet class of the "multicast" forwarding type is determined by a result of multiplying an available number of connection outputs of the monitored node to directly adjacent nodes of the monitored node by the incoming data traffic, the available number being determined between zero and a number of connection outputs to directly adjacent nodes of the monitored node which has been reduced by one.

6. The method as claimed in claim 3, wherein the expected outgoing data traffic for the data packet class of the "broadcast" forwarding type is determined by a result of multiplying a number of connection outputs to directly adjacent nodes of the monitored node which has been reduced by one by the incoming data traffic.

7. The method as claimed in claim 1, wherein the steps in claim 1 are carried out only if the outgoing data traffic exceeds a predefinable volume of data per unit of time.

8. The method as claimed in claim 1, wherein at least one of the connections of the monitored node, in particular one of the connections going out from the monitored node, is interrupted if the monitored node is detected as a faulty node.

9. An apparatus for increasing quality of service in a network having a plurality of nodes if there is a faulty node, in which the nodes are connected to one another via respective connections for the purpose of interchanging data packets, the faulty node is coupled to at least one device and the at least one device operates as a data sink and/or a data source, wherein said apparatus comprises:
  a computer readable hardware storage device having computer readable program code stored therein, said program code executable by a processor of a computer system, said program code further having the following units:
  a) a first unit for selecting at least one of the nodes as a monitored node;
  b) a second unit for producing at least two observer nodes by selecting from the plurality of nodes, the monitored node being excluded from the selection, in such a manner that both incoming data traffic of a respective data packet class) to the monitored node from at least one of the at least two observer nodes and outgoing data traffic of the respective data packet class from the monitored node to at least one of the at least two observer nodes are completely determined;
c) a third unit for recording the incoming data traffic and the outgoing data traffic of the respective observer nodes;
d) a fourth unit (M4) for generating expected total outgoing data traffic of the monitored node on the basis of (i) the outgoing data traffic produced by the respective incoming data traffic of the respective data packet class and (ii) expected data traffic of the data source of the at least one device;
e) a fifth unit for generating a difference value from a difference between the outgoing data traffic and the expected total outgoing data traffic; and
f) a sixth unit for detecting the monitored node as a faulty node if the difference value exceeds a predefinable threshold value.

10. The apparatus as claimed in claim 9, wherein a seventh unit which is configured in such a manner that one or more method stepscan be implemented and carried out using a seventh unit.

\* \* \* \* \*